United States Patent
Sung

(10) Patent No.: US 10,864,936 B2
(45) Date of Patent: Dec. 15, 2020

(54) WORM WHEEL OF ELECTRIC POWER STEERING APPARATUS

(71) Applicant: MANDO CORPORATION, Pyeongtaek-si (KR)

(72) Inventor: Kee Woong Sung, Seoul (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 16/155,132

(22) Filed: Oct. 9, 2018

(65) Prior Publication Data
US 2019/0106146 A1    Apr. 11, 2019

(30) Foreign Application Priority Data
Oct. 10, 2017  (KR) .................. 10-2017-0129100

(51) Int. Cl.
| | | |
|---|---|---|
| B62D 7/22 | (2006.01) | |
| B62D 5/04 | (2006.01) | |
| F16H 57/00 | (2012.01) | |
| F16H 1/16 | (2006.01) | |
| B62D 3/10 | (2006.01) | |
| F16H 55/14 | (2006.01) | |

(52) U.S. Cl.
CPC ............. *B62D 5/0454* (2013.01); *B62D 3/10* (2013.01); *B62D 5/0409* (2013.01); *B62D 7/226* (2013.01); *F16H 1/16* (2013.01); *F16H 55/14* (2013.01); *F16H 57/0006* (2013.01)

(58) Field of Classification Search
CPC .......... B62D 5/0454; B62D 3/04; B62D 3/10; B62D 5/24; F16H 1/16; F16H 1/30; F16H 55/22; F16H 57/0006
See application file for complete search history.

(56) References Cited

U.S. PATENT DOCUMENTS 7,244,185 B2 *  7/2007  Kamdem ............... F16D 3/58
                                                      464/75
10,415,683 B2 *  9/2019  Park ...................... F16H 1/16

FOREIGN PATENT DOCUMENTS

KR        20120137027 A  * 12/2012

OTHER PUBLICATIONS

English machine translation of KR 20120137027. (Year: 2012).*

* cited by examiner

*Primary Examiner* — Randell J Krug
(74) *Attorney, Agent, or Firm* — Morgan, Lewis & Bockius LLP

(57) ABSTRACT

A worm wheel of an electric power steering apparatus includes: an inner wheel coupled to a steering shaft; an outer wheel disposed outside an outer circumference of the inner wheel and having a plurality of teeth on an outer circumferential surface to be engaged with a worm of a worm shaft; and a damper interposed between the inner wheel and the outer wheel.

18 Claims, 5 Drawing Sheets

WORM WHEEL OF ELECTRIC POWER STEERING APPARATUS

CROSS REFERENCE TO RELATED APPLICATION

This application claims the benefit of priority to Korean Patent Application No. 10-2017-0129100, filed on Oct. 10, 2017, which is hereby incorporated by reference for all purposes as if fully set forth herein.

TECHNICAL FIELD

The present disclosure relates to a worm wheel of an electric power steering apparatus, and more specifically, to a worm wheel of an electric power steering apparatus, in which a damper is inserted and interposed between an inner wheel and an outer wheel of a worm wheel such that the worm wheel absorbs torsional load transmitted to a worm shaft from a steering shaft through the worm wheel.

BACKGROUND

Generally, a vehicle is equipped with a steering system by which a driver can intentionally change a traveling direction. The steering system is an auxiliary system configured to arbitrarily change a rotating center about which a front wheel of a vehicle pivots to drive the vehicle in a direction desired by the driver.

Such a steering system of a vehicle includes a Motor-Driven Power Steering (MDPS) in which steering power is controlled by a motor, and an electronic control unit precisely drives the motor according to traveling conditions detected by various sensors such as a vehicle speed sensor and a steering torque sensor, a torque generated by the motor is transmitted to a steering column or pinion through a reducer to supplement the steering power of the driver who manipulates a steering wheel connected to the steering column and pinion.

Accordingly, the MDPS provides steering performance which allows the driver to maintain the most optimum steering conditions by providing a light and convenient steering state at low speeds and a heavy and stable steering state at high speeds, to respond to a sudden emergency situation through rapid steering, and the like.

Electric power steering systems may be classified into various kinds based on a position in which a steering column is positioned, and the electric power steering system is a system in which a motor including a reducer is installed around a steering column for fixing a steering shaft connecting a steering wheel of a driver's seat and a gear box of a lower portion of a vehicle to a vehicle body or around the gear box in which a pinion coupled to a rack bar is embedded, and rotating power of the steering wheel manipulated by the driver is transmitted to the rack bar by the reducer of the motor.

When the vehicle, to which the above-described column type electric power steering is applied, travels, since reversely input load is applied due to factors such as impacts transmitted from a road surface, or abrasion gradually occurs between contact portions of rotating parts in a structure in which gears are engaged to transmit rotating power, and particularly, a gap of a worm shaft increases in an axial direction, rattle noise inevitably occurs at a portion in which the worm shaft and the worm wheel are engaged and rotated.

A gap prevention unit configured to press against a worm shaft to remove a gap between the worm shaft and a worm wheel generally using a rattle spring has been used to prevent the above-described phenomenon.

Accordingly, the conventional column type electric power steering generally includes a unit for preventing the above described rattle phenomenon, and such a unit is formed by supplementing the gap between the worm shaft and the worm wheel gear, and has a structure in which, for example, rubber members are put in both ends of the worm wheel or the worm wheel is tilted.

In related art, there is a rattle noise preventing type motor driven power steering system including a taper slider in which a gap prevention unit configured to prevent generation of a gap between a worm shaft rotated by a motor configured to convert steering power of a driver to rotating power and a worm wheel configured to transmit the steering power to operate a gear box connected to the steering shaft is inserted into a space between a support bearing coupled to an end portion of the worm shaft rotated by the motor supplementing the steering power and an inner side surface of a housing accommodating the worm wheel engaged with the worm shaft and rotated to transmit the rotating power to the steering shaft connected to the gear box, and continuously presses against the worm shaft.

In another related art, there is electric power steering system including a worm shaft part including a worm gear, a worm wheel part in which an outer circumferential surface is engaged with the worm gear and rotated, a hub portion engaged with an inner circumferential surface of the worm wheel part and rotated, a motor part configured to rotate the worm shaft part, and a vibration prevention part installed in the hub portion and configured to suppress noise.

However, a rattle prevention structure related to a conventional worm shaft includes a gap prevention unit, since the structure continuously presses against the worm shaft, an external impact is directly transmitted to the worm shaft, and thus, components may be easily damaged due to the repeated impacts.

In addition, the rattle prevention structure applied to the conventional worm wheel includes the vibration prevention part including a viscous fluid and a cover plate to suppress noise, but in this case, the viscous fluid can be contaminated and a normal vibration prevention function of the viscous fluid can be removed when the viscous fluid leaks to the outside, and it is cumbersome to frequently inject the viscous fluid into the rattle prevention structure.

SUMMARY

An aspect of the present disclosure is to provide a worm wheel of an electric power steering apparatus in which a damper is inserted and disposed such that the worm wheel absorbs torsional load transmitted to a worm shaft from a steering shaft through the worm wheel to reduce the torsional load when a vehicle travels on a harsh road.

Another aspect of the present disclosure is to provide a worm wheel of an electric power steering apparatus which reduces deformation and abrasion of a worm of a worm shaft and a gear part of the worm wheel by reducing vibrations caused by torsional load.

Besides the above-described technical objectives of the present disclosure, features and advantages of the present disclosure will be described below, or will be clearly understood by those skilled in the art through the technology and description.

According to an exemplary embodiment of the present disclosure, a worm wheel of an electric power steering apparatus includes: an inner wheel coupled to a steering shaft; an outer wheel disposed outside an outer circumference of the inner wheel and having a plurality of teeth on an outer circumferential surface to be engaged with a worm of a worm shaft is formed; and a damper interposed between the inner wheel and the outer wheel.

In the worm wheel of the electric power steering apparatus according to the exemplary embodiment of the present disclosure, since the damper is inserted and interposed between the inner wheel and the outer wheel of the worm wheel, in a case in which a vehicle travels on a harsh road, the worm wheel can absorb torsional load transmitted from the steering shaft to the worm shaft through the worm wheel to reduce the torsional load.

In addition, by reducing vibrations caused by the torsional load, deformation and abrasion of the worm wheel can be reduced.

Accordingly, abrasion of a worm of the worm shaft and a gear part of the worm wheel can be reduced, and finally rattle noise caused by the abrasion of the worm of the worm shaft and the gear part of the worm wheel can be reduced so that a gap prevention unit may not be required.

Since the damper is inserted into and disposed in the worm wheel of the electric power steering apparatus according to the exemplary embodiment of the present disclosure, in a case in which a vehicle travels a harsh road, the worm wheel can absorb torsional load transmitted form the steering shaft to the worm shaft through the worm wheel to reduce the torsional load.

Accordingly, abrasion of the worm of the worm shaft and the gear part of the worm wheel can be reduced, and finally rattle noise caused by the abrasion of the worm of the worm shaft and the gear part of the worm wheel can be reduced so that a gap prevention unit may not be required.

Effects which can be obtained from the present disclosure are not limited to the above-described effects, and other effects which are not described above will be clearly understood by those skilled in the art through the following description.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments that are easily performed by those skilled in the art will be described in detail with reference to the accompanying drawings. The embodiments of the present disclosure may be implemented in several different forms and are not limited to the embodiments described herein.

Throughout this specification, when a part is referred to as being "connected" to another part, it includes "directly connected" and "electrically connected" via an intervening part. When a certain part "includes" a certain component, this does not exclude other components unless explicitly described otherwise, and other components may in fact be included.

Hereinafter, embodiments that are easily performed by those skilled in the art will be described in detail with reference to the accompanying drawings. However, the embodiments of the present disclosure may be implemented in several different forms, and are not limited to the embodiments described herein.

Figure 1:
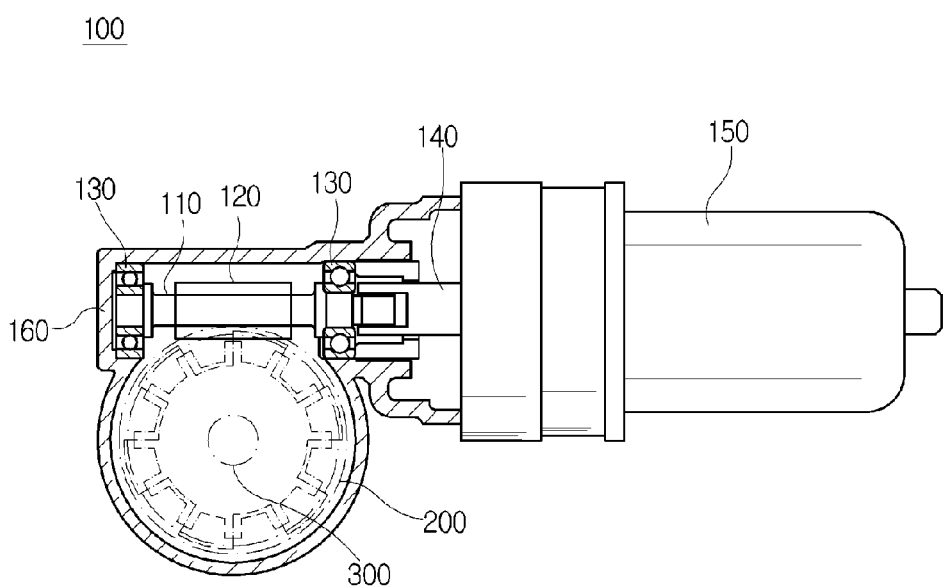
FIG. 1 is a cross-sectional view illustrating a reducer of an electric power steering apparatus according to an exemplary embodiment of the present disclosure.

FIG. 1 is a cross-sectional view illustrating a reducer of an electric power steering apparatus according to an exemplary embodiment of the present disclosure.

Referring to FIG. 1, a reducer 100 has a structure having a worm shaft 110 formed of a metal material and having a central portion in which a worm 120 is disposed; worm bearings 130 installed on both ends of the worm shaft 110 to support the worm shaft 110 which is connected with a motor shaft 140; and a motor 150 rotating the worm shaft 110.

A worm wheel 200 is disposed outside the worm 120 in a circumferential direction thereof as a reducer to be engaged with the worm 120 formed at the central portion of the worm shaft 110.

The worm wheel 200 is installed on a steering shaft 300 configured to transmit rotating power of a steering wheel manipulated by a driver to transmit rotating power of the worm shaft 110 generated by driving of the motor 150 to the steering shaft 300.

When the steering shaft 300 generates rotating power by an external impact and transmits the rotating power to the worm wheel 200, the worm wheel 200 transmits the rotating power transmitted through the steering shaft 300 to the worm shaft 110.

The worm shaft 110 and the worm wheel 200 are engaged through a worm gear method, and are installed in a housing 160 to be protected from outside environments.

Figure 2:
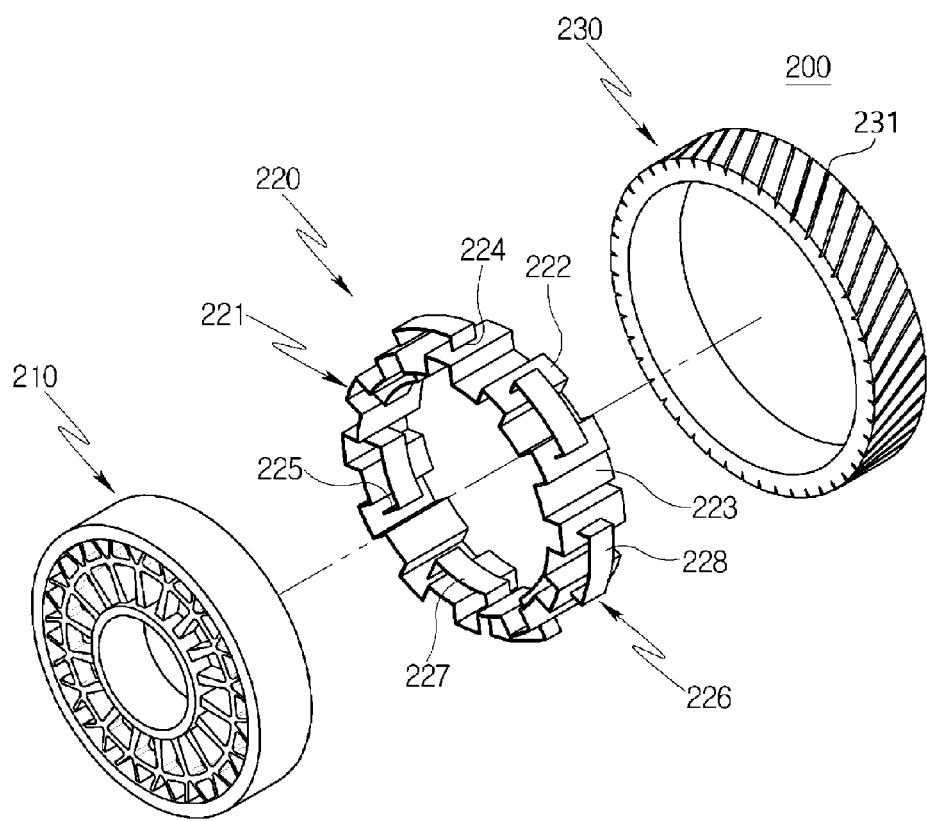
FIG. 2 is an exploded perspective view illustrating a worm wheel of the electric power steering apparatus according to an exemplary embodiment of the present disclosure.

FIG. 2 is an exploded perspective view illustrating the worm wheel of the electric power steering apparatus according to an exemplary embodiment of the present disclosure.

Referring to FIG. 2, the worm wheel 200 includes an inner wheel 210 coupled to the steering shaft 300, an outer wheel 230 disposed outside an outer circumference of the inner wheel 210 and having an outer circumferential surface on which a gear 231 engaged with the worm 120 of the worm shaft 110 is formed, and a damper 220 inserted and interposed between the inner wheel 210 and the outer wheel 230.

When the worm shaft 110 or steering shaft 300 transmits rotating power to the worm wheel 200, the inner wheel 210 and the outer wheel 230 rotate together. When rotating power transmitted to the worm wheel 200 suddenly increases (for example, when a vehicle travels a harsh road, and load transmitted to a rack bar (not shown) and the steering shaft 300 from a wheel suddenly increases), twist may occur between the inner wheel 210 and the outer wheel 230.

The damper 220 absorbs torsional load generated between the inner wheel 210 and the outer wheel 230, reduces the torsional load transmitted from the steering shaft 300, and transmits the torsional load to the worm shaft 110.

In addition, the damper 220 may reduce vibrations transmitted to the worm shaft 110 by absorbing the torsional load of the worm wheel 200 to prevent deformation and damage of the worm shaft 110 and the worm wheel 200.

Figure 3:
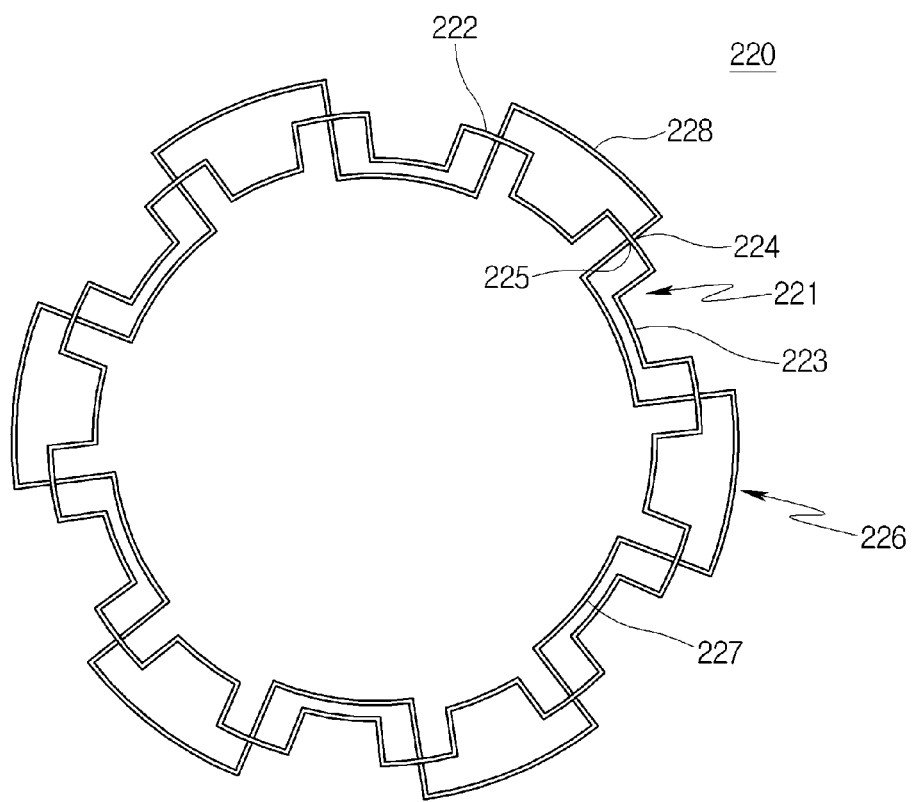
FIG. 3 is a cross-sectional view illustrating a damper of the worm wheel according to an exemplary embodiment of the present disclosure.

FIG. 3 is a cross-sectional view illustrating the damper of the worm wheel according to an exemplary embodiment of the present disclosure.

Referring to FIG. 3, the damper 220 includes a body 221 for a damping function when the worm wheel rotates, and a fixing part 226 configured to couple the damper to the outer wheel and the inner wheel.

The body 221 has a closed ring shape and includes at least one protruding portion 222 protruding outward in a diameter direction and at least one recessed portion 223 recessed inward in the diameter direction.

The body 221 may be formed of a metal material having a predetermined elastic force, and a plurality of protruding portions 222 and a plurality of recessed portions 223 are alternately formed and connected in a circumferential direction so that repeated irregularities may be formed.

That is, the plurality of protruding portions 222 are connected to the plurality of recessed portions 223 in a ring shape to form the body 221.

The fixing part 226 may include inner wheel fixing parts 227 for coupling the damper 220 and the inner wheel 210 and outer wheel fixing parts 228 for coupling the damper 220 and the outer wheel 230.

The inner wheel fixing part 227 protrudes inward from an inner circumferential surface of the protruding portion 222 in the diameter direction, and the outer wheel fixing part 228 protrudes outward from an outer circumferential surface of the protruding portion 222 in the diameter direction.

In addition, the inner wheel fixing part 227 and the outer wheel fixing part 228 may be connected in a zigzag shape.

The inner wheel fixing part 227 is accommodated inside the inner wheel and connects the protruding portions 222 of the body 221. That is, both end portions of the inner wheel fixing part 227 may be bent and are connected to any one protruding portion and another adjacent protruding portion.

That is, one end of the inner wheel fixing part 227 is connected to any one protruding portion 222 among the plurality of protruding portions, and the other end of the inner wheel fixing part 227 is connected to the adjacent protruding portion 222 in the circumferential direction.

Referring to FIG. 3, the inner wheel fixing part 227 may substantially have a cross section in a "⌊⌋" shape. For example, one end of the inner wheel fixing part 227 protrudes inward (toward the steering shaft) from an inner circumferential surface 225 of any one protruding portion 222 of the body 221, and the other end thereof is connected to an inner circumferential surface of the adjacent protruding portion 222. Here, the inner wheel fixing part 227 may spaced apart from the inner circumferential surface of the recessed portion 223 of the body 221.

In addition, one ends and the other ends of the inner wheel fixing parts 227 connected to the protruding portions 222 extend inward in the diameter direction and are bent in opposite circumferential directions such that the inner wheel fixing parts 227 are connected.

The outer wheel fixing part 228 is disposed outside the inner wheel and connects the protruding portions 222 of the body 221. That is, both end portions of the outer wheel fixing part 228 may be bent, and the both end portions may be connected to any one protruding portion and another adjacent protruding portion.

That is, one end of the outer wheel fixing part 228 is connected to any one protruding portion 222 among the plurality of protruding portions, and the other end of the outer wheel fixing part 228 is connected to the adjacent protruding portion 222 in the circumferential direction.

Referring to FIG. 3, the outer wheel fixing part 228 may substantially have a cross section in a "⌈⌉" shape. For example, one end of the outer wheel fixing part 228 protrudes outward (toward the worm shaft) from an outer circumferential surface 224 of any one protruding portion 222 of the body 221, and the other end thereof is connected to an outer circumferential surface of the adjacent protruding portion 222.

In addition, one end portions and the other end portions of the outer wheel fixing parts 228 connected to the protruding portions 222 extend inward, and are bent in opposite circumferential directions such that the outer wheel fixing parts 228 are connected.

The inner wheel fixing part 227 and the outer wheel fixing part 228 are alternately disposed in a circumferential direction of the fixing part 226.

In addition, one end and the other end of the inner wheel fixing part 227 are disposed at positions corresponding to one end and the other end of the outer wheel fixing part 228.

Figure 4:
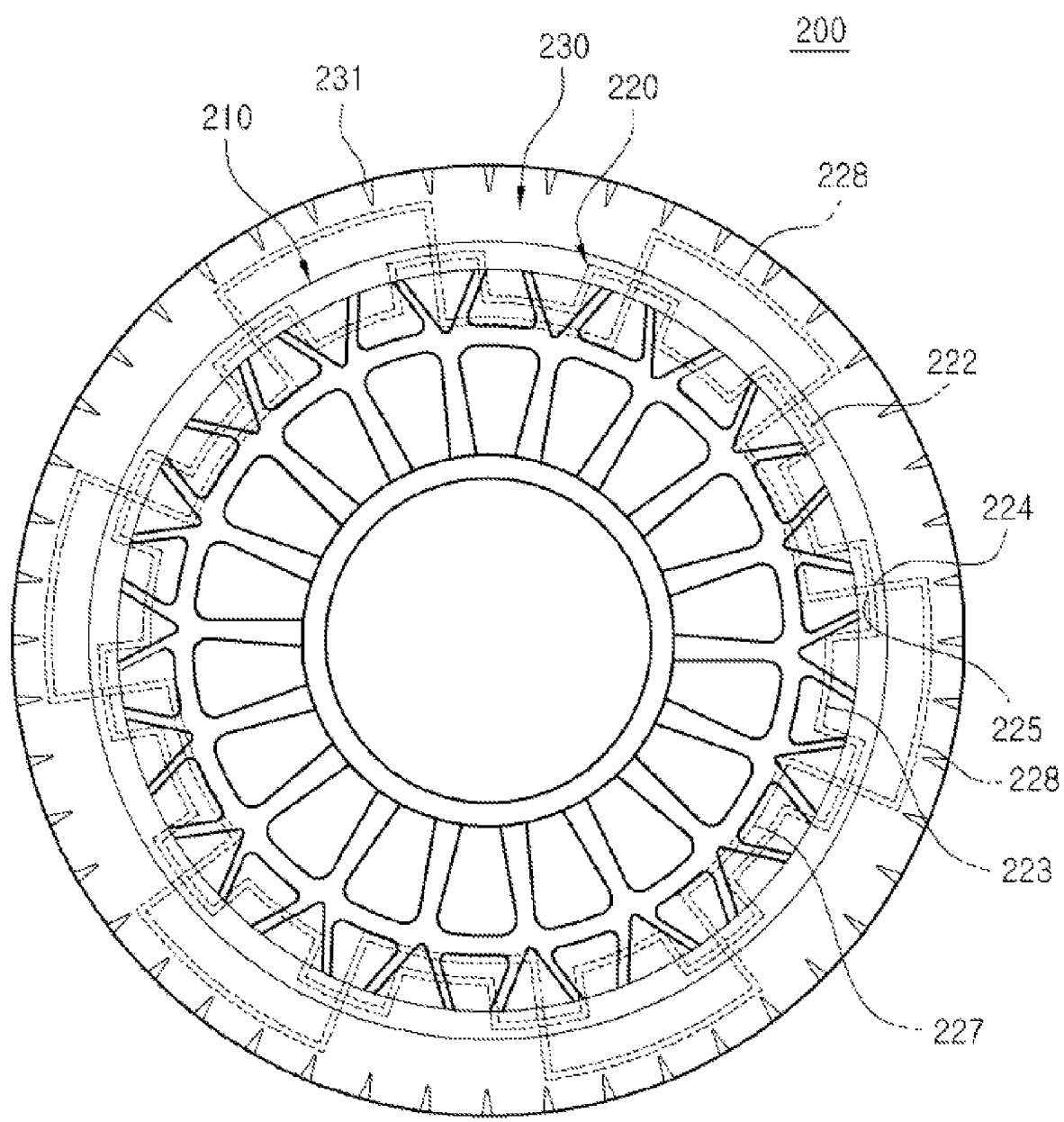
FIG. 4 is a cross-sectional view illustrating the worm wheel of the electric power steering apparatus according to an exemplary embodiment of the present disclosure.
Figure 5:
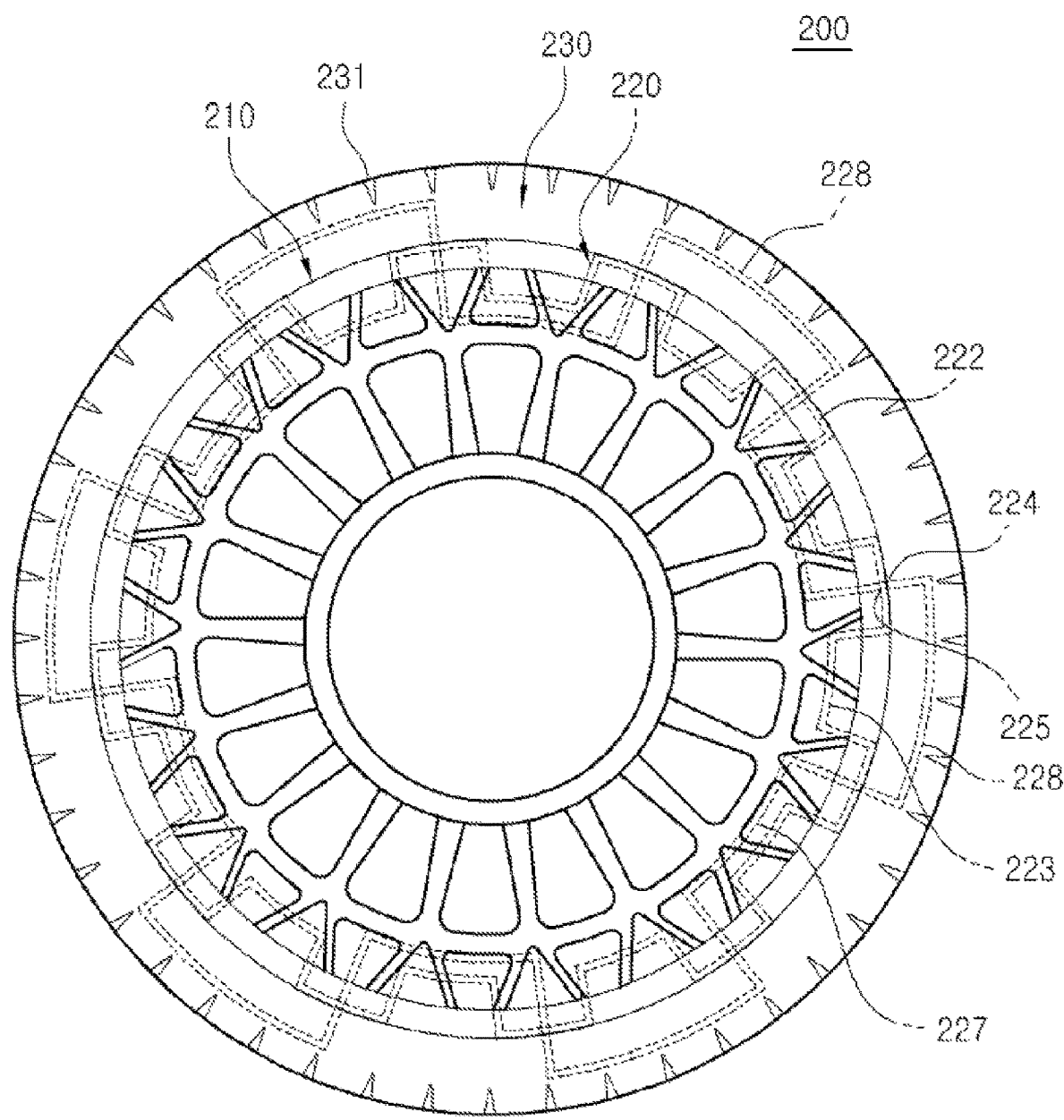
FIG. 5 is a cross-sectional view illustrating the worm wheel of the electric power steering apparatus according to another exemplary embodiment of the present disclosure.

FIGS. 4 and 5 are cross-sectional views illustrating the worm wheel of the electric power steering apparatus according to exemplary embodiments of the present disclosure.

As illustrated in FIGS. 4 and 5, the damper 220 is inserted and interposed between the inner wheel 210 and the outer wheel 230, the inner wheel fixing part 227 is coupled to the inner wheel 210, and the outer wheel fixing part 228 is coupled to the outer wheel 230.

The body 221 of the damper 220 may be formed to be accommodated inside the inner wheel 210. That is, the outer circumferential surface of the protruding portion 222 may be matched with the outer circumferential surface of the inner wheel 210 (e.g., FIG. 5), or the outer circumferential surface of the protruding portion 222 may be positioned inside and spaced apart from the outer circumferential surface of the inner wheel 210 (e.g., FIG. 4).

The inner wheel 210 may be formed through an injection molding method to accommodate the damper 220, and the outer wheel 230 may be formed through an injection molding method outside the inner wheel 210 accommodating the damper 220.

The damper 220 serves as a spring configured to absorb torsional load between the inner wheel 210 and the outer wheel 230, and serves to reduce vibrations caused by the torsional load.

As described above, in the worm wheel 200 of the electric power steering apparatus according to the an exemplary embodiment of the present disclosure, since the damper 220 is inserted and interposed between the inner wheel 210 and the outer wheel 230 of the worm wheel 200, in a case in which a vehicle travels on a harsh road, the worm wheel 200 may absorb torsional load transmitted from the steering shaft 300 to the worm shaft 110 through the worm wheel 200 to reduce the torsional load.

In addition, by reducing vibrations caused by the torsional load, deformation and abrasion of the worm 120 of the worm shaft 110 and the gear 231 of the worm wheel 200 can be reduced.

Accordingly, abrasion of the worm 120 of the worm shaft 110 and the gear 231 of the worm wheel 200 can be reduced, and finally, rattle noise caused by the abrasion of the worm 120 of the worm shaft 110 and the gear 231 of the worm wheel 200 can be reduced so that a gap prevention unit may not be required.

It will be understood by those skilled in the art that the disclosure may be performed in other concrete forms without changing the technological scope and essential features. Therefore, the above-described embodiments should be considered in a descriptive sense only and not for purposes of limitation. The scope of the present disclosure is defined not by the detailed description but by the appended claims, and encompasses all modifications and alterations derived from meanings, the scope and equivalents of the appended claims.

What is claimed is:

1. A worm wheel of an electric power steering apparatus, comprising:
    an inner wheel coupled to a steering shaft;
    an outer wheel disposed outside an outer circumference of the inner wheel and having a plurality of teeth on an outer circumferential surface to be engaged with a worm of a worm shaft; and
    a damper interposed between the inner wheel and the outer wheel,
    wherein an inner diameter of the damper is smaller than an outer diameter of the inner wheel,
    wherein the damper comprises:
        a body comprising at least one protruding portion protruding outward in a radial direction and having a ring shape; and
        a fixing part disposed on at least any one side of an outer side or an inner side of the body and configured to fix the inner wheel and the outer wheel to the body, and
    wherein an outer circumferential surface of the protruding portion is disposed between an outer circumferential surface and an inner circumferential surface of the inner wheel and spaced apart from the outer circumferential surface of the inner wheel.

2. The worm wheel of claim 1, wherein the body further comprises at least one recessed portion recessed inward in the radial direction.

3. The worm wheel of claim 2, wherein each of the protruding portion and the recessed portion is provided in plural, and
    wherein the plurality of protruding portions and the plurality of recessed portions are alternately disposed and connected in a circumferential direction.

4. The worm wheel of claim 2, wherein the fixing part comprises an inner wheel fixing part protruding inward from an inner circumferential surface of the protruding portion in the radial direction.

5. The worm wheel of claim 4, wherein each of the protruding portion and the recessed portion is provided in plural, and
    wherein a first end of the inner wheel fixing part is connected to a first protruding portion among the plurality of protruding portions, and a second end of the inner wheel fixing part is connected to a second protruding portion adjacent the first protruding portion in a circumferential direction.

6. The worm wheel of claim 5, wherein the first and second ends of the inner wheel fixing part extend inward in the radial direction from inner circumferential surfaces of the first and second protruding portions, respectively, and then are bent toward each other in the radial direction in opposite circumferential directions to be connected to each other.

7. The worm wheel of claim 4, wherein the fixing part further comprises an outer wheel fixing part protruding outward from the outer circumferential surface of the protruding portion.

8. The worm wheel of claim 7, wherein the protruding portion is provided in plural, a first end of the outer wheel fixing part is connected to a third protruding portion among the plurality of protruding portions, and a second end of the outer wheel fixing part is connected to a fourth protruding portion adjacent the third protruding portion in a circumferential direction.

9. The worm wheel of claim 8, wherein the first and second ends of the outer wheel fixing part extend outward from the outer circumferential surface of the protruding portion in the radial direction, and then are bent toward each other in the circumferential direction to be connected to each other.

10. The worm wheel of claim 7, wherein each of the inner wheel fixing part and the outer wheel fixing part is provided in plural, and
    wherein each of the plurality of inner wheel fixing parts and each of the plurality of outer wheel fixing parts are alternately disposed in a circumferential direction.

11. The worm wheel of claim 10, wherein each of the inner wheel fixing part and the outer wheel fixing part includes one or more ends such that the one or more ends of the inner wheel fixing part are connected to the one or more ends of the outer wheel fixing part, respectively.

12. The worm wheel of claim 1, wherein the body of the damper is accommodated inside the inner wheel.

13. The worm wheel of claim 1, wherein the protruding portion protrudes outwardly toward the outer circumferential surface of the inner wheel such that the outer circumferential surface of the protruding portion coincides with the outer circumferential surface of the inner wheel.

14. The worm wheel of claim 1, wherein the damper has a closed ring shape.

15. The worm wheel of claim 1, wherein the damper is formed of a metal material.

16. The worm wheel of claim 6, wherein the inner wheel fixing part has a cross section having a "U" shape.

17. The worm wheel of claim 9, wherein the outer wheel fixing part has a cross section having an inversed "U" shape.

18. The worm wheel of claim 9, wherein an outer diameter of the damper is greater than an inner diameter of the outer wheel.

* * * * *